US 7,305,128 B2

(12) United States Patent
Lee et al.

(10) Patent No.: US 7,305,128 B2
(45) Date of Patent: Dec. 4, 2007

(54) ANCHOR PERSON DETECTION FOR TELEVISION NEWS SEGMENTATION BASED ON AUDIOVISUAL FEATURES

(75) Inventors: Shih-Hung Lee, Taipei (TW);
Chia-Hung Yeh, Tai-Nan (TW);
Hsuan-Huei Shih, Taipei (TW);
Chung-Chieh Kuo, Taipei (TW)

(73) Assignee: MAVs Lab, Inc., Aspire Park, Lung-Ten, Tau-Yuan (TW)

( * ) Notice: Subject to any disclaimer, the term of this patent is extended or adjusted under 35 U.S.C. 154(b) by 433 days.

(21) Appl. No.: 10/908,826

(22) Filed: May 27, 2005

(65) Prior Publication Data
US 2006/0288291 A1 Dec. 21, 2006

(51) Int. Cl.
*G06K 9/34* (2006.01)
*G06K 9/00* (2006.01)
*H04N 5/14* (2006.01)
*H04N 9/64* (2006.01)

(52) U.S. Cl. ............... 382/173; 382/170; 348/700
(58) Field of Classification Search ........... 382/173, 382/170; 348/700
See application file for complete search history.

(56) References Cited

U.S. PATENT DOCUMENTS

| 6,363,380 | B1 | 3/2002 | Dimitrova |
| 6,493,042 | B1* | 12/2002 | Bozdagi et al. ............. 348/700 |
| 6,549,643 | B1* | 4/2003 | Toklu et al. ................ 382/107 |
| 6,714,909 | B1* | 3/2004 | Gibbon et al. ............. 704/246 |
| 6,816,836 | B2 | 11/2004 | Basu et al. |
| 6,922,691 | B2 | 7/2005 | Flank |
| 6,925,197 | B2 | 8/2005 | Dimitrova |
| 7,184,959 | B2* | 2/2007 | Gibbon et al. ............. 704/270 |
| 2003/0123712 | A1* | 7/2003 | Dimitrova et al. .......... 382/118 |
| 2004/0008789 | A1* | 1/2004 | Divakaran et al. ..... 375/240.26 |

(Continued)

FOREIGN PATENT DOCUMENTS

JP 2003264757 9/2003

(Continued)

OTHER PUBLICATIONS

A. Hampapur, R.Jain and T. Weymouth, "Digital Video Segmentation", Oct. 1994, pp. 357-364, ACM Multimedia, San Francisco, CA, USA.

(Continued)

*Primary Examiner*—Andrew W. Johns
*Assistant Examiner*—Damon Conover
(74) *Attorney, Agent, or Firm*—Winston Hsu

(57) ABSTRACT

A video segmentation method for segmenting video clips according to content of the video clips is disclosed. The method comprises scanning pixels of video frames with a first horizontal scan line to determine if colors of the pixels fall within a predetermined color range; creating a color map utilizing pixels located on the first horizontal scan line from a plurality of successive video frames; labeling the current video segment as a candidate video segment if the color map indicates the presence of a stable region of pixels falling within the predetermined color range for a predetermined number of successive video frames; and performing histogram color comparisons on the stable regions for detecting shot transitions. Audio signals of the video clips may also be analyzed to further verify the candidate video segments.

17 Claims, 5 Drawing Sheets

U.S. PATENT DOCUMENTS

2004/0078341 A1   4/2004   Steichen
2004/0143434 A1   7/2004   Divakaran
2005/0190965 A1*  9/2005   Hwang et al. .............. 382/165

FOREIGN PATENT DOCUMENTS

JP   2004229283   8/2004
TW   I223162      11/2004

OTHER PUBLICATIONS

Boon-Lock Yeo et al.,"Rapid scene analysis on compressed video," IEEE Transactions of Circuit and Systems for Video Technology, vol. 5, No. 6, pp. 533-544. 1995.

Hsuan-Wei Chen, Jin-Hua Kuo, Jen-Hao Yeh, and Ja-Ling Wu, "A multi-model-feature based algorithm for parsing news program videos", In Processing of the IEEE International Conference On Acoustics, Speech, and Signal Processing, vol. 3, pp. 177-180, 2003.

J. S. Boreczky and L. D. Wilcox, "A hidden markov model framework for video segmentation using audio and image features,"Proceedings of IEEE International Conference on Acoustics, Speech, and Signal Processing, pp. 3741-3744, 1998.

Lekha Chaisorn, Tat-Seng Chua, Chin-Hui Lee and Qi Tian "A hierarchical approach to story segmentation of large broadcast news video corpus", proceedings of Intl conference on Multimedia & Expo, Jun. 26-30, 2004, Taipei, Taiwan.

P.S. Lai, L.Y. Lai, T.C. Tseng, Y.H. Chen and Hsin-Chia Fu, "A Fully Automated Web-Based TV-News System", PCM 2004, Part III, pp. 515-522.

Qian Huang, Zhu Liu, Aaron Rosenberg, David Gibbo, N Behzad Shahraray, "Automated generation of news content hierarchy by integrating audio, video, and text information", In Proceeding of the IEEE International Conference On acoustics, speech, and signal processing, vol. 6, pp. 3025-3028, 1999.

R. Zabih, J. Miller and K. Mai, "A feature-based algorithm for detecting and classifying scene breaks," Proceedings of ACM Conferences on Multimedia, 1995.

Winston H.-M. Hsu and Shih-Fu Chang, "Generative discriminative, and ensemble learning on multi-model perceptual fusion toward news video story segmentation" IEEE International Conference on Multimedia and Expo, Taipei, Taiwan, Jun. 27-30, 2004.

* cited by examiner

ANCHOR PERSON DETECTION FOR TELEVISION NEWS SEGMENTATION BASED ON AUDIOVISUAL FEATURES

BACKGROUND OF INVENTION

1. Field of the Invention

The present invention relates to video segmentation, and more specifically, to a method of detecting news anchor persons for dividing news broadcasts into segments.

2. Description of the Prior Art

As there are more and more news channels available on television, the amount of news content available is growing. Accordingly, it is becoming harder for people to search and index the news broadcasts. News programs are composed of several different news segments which are often not related to one another. In order to aid in indexing and categorizing news segments, it is helpful to utilize video images of a news anchor person to determine when segments begin and end. News anchor person shots are the most important shots in the structure of every news segment. Usually, the news anchor person is shown in the beginning and/or the end of a story to introduce, summarize, or comment on the story. These shots of the news anchor persons are useful for providing the main idea of the news story and for enabling a viewer to browse a video recording of the news. As a result, news anchor person detection is a logical way to help identify news segments.

In the past, prior art methods for television news segmentation have used machine learning technology for automatically classifying the news. However, editing effects such as split screens showing data from different sources will limit the performance of these prior art methods. Other methods use complex algorithms such as face detection and speaker identification because both the anchor persons and their positions are unknown. A brief list of other previous techniques is head detection, talking mouth detection, speech and music classification or recognition, closed-caption extraction and video optical character recognition (OCR), and model-based methods. Unfortunately, the computational complexity of each of these algorithms is prohibitively high.

SUMMARY OF INVENTION

It is therefore an objective of the claimed invention to provide a method for scanning video frames of news broadcasts for pixel colors matching a skin color range for detecting the presence of a news anchor person in order to solve the above-mentioned problems.

According to the claimed invention, a video segmentation method for segmenting video clips according to content of the video clips is disclosed. The method comprises receiving a video signal containing a plurality of video frames; applying a first horizontal scan line to video frames of the video signal, the first horizontal scan line selecting at least one row of pixels for analysis; analyzing the pixels of the video frame located on the first horizontal scan line to determine if colors of the pixels fall within a predetermined color range; indicating regions of adjacent pixels in the video frame that fall within the predetermined color range; creating a color map utilizing pixels located on the first horizontal scan line from a plurality of successive video frames; labeling the current video segment as a candidate video segment if the color map indicates the presence of a stable region of pixels falling within the predetermined color range for a predetermined number of successive video frames; for each candidate video segment, selecting one video frame out of every N video frames and creating a histogram of the stable region of each of the selected video frames; performing a first histogram comparison between the histograms corresponding to pairs of successively selected video frames; when a first histogram difference resulting from the first histogram comparison is greater than a first threshold value, performing a second histogram comparison on the stable regions of pairs of consecutive video frames located between the pair of successively selected video frames which resulted in the first histogram difference being greater than the first threshold value; and indicating a shot change in the candidate video segment when the second histogram comparison yields a second histogram difference greater than a second threshold value.

According to another embodiment of the claimed invention, a video segmentation method for segmenting video clips according to content of the video clips is disclosed. The method comprises receiving a video signal containing a plurality of video frames; receiving an audio signal associated with the received video signal; applying first and second horizontal scan lines to video frames of the video signal, the first and second horizontal scan lines each selecting at least one row of pixels for analysis; assigning pixels of the video frame located on each of the first and second horizontal scan lines a logical value of "1" if the colors of the pixels fall within a predetermined color range; performing a logical OR operation using corresponding pixels located on the first and second horizontal scan lines to create combined pixel data; utilizing the combined pixel data to indicate regions of adjacent pixels in the video frame that fall within the predetermined color range; creating a color map utilizing the combined pixel data from a plurality of successive video frames; labeling the current video segment as a candidate video segment if the color map indicates the presence of a stable region of pixels falling within the predetermined color range for a predetermined number of successive video frames; for each candidate video segment, selecting one video frame out of every N video frames and creating a histogram of the stable region of each of the selected video frames; performing a first histogram comparison between the histograms corresponding to pairs of successively selected video frames; when a first histogram difference resulting from the first histogram comparison is greater than a first threshold value, performing a second histogram comparison on the stable regions of pairs of consecutive video frames located between the pair of successively selected video frames which resulted in the first histogram difference being greater than the first threshold value; indicating a shot change in the candidate video segment when the second histogram comparison yields a second histogram difference greater than a second threshold value; and analyzing the audio signal for filtering out candidate video segments, wherein the audio signal is processed in audio frames of a predetermined size.

According to another embodiment of the claimed invention, a video segmentation method for segmenting television news video clips according to detection of a news anchor in the video clips is disclosed. The method comprises receiving a video signal containing a plurality of video frames of a news broadcast; applying a first horizontal scan line to video frames of the video signal, the first horizontal scan line selecting at least one row of pixels for analysis; analyzing the pixels of the video frame located on the first horizontal scan line to determine if colors of the pixels fall within a predetermined color range for detecting skin color of the news anchor; indicating regions of adjacent pixels in the video frame that fall within the predetermined color range;

creating a color map utilizing pixels located on the first horizontal scan line from a plurality of successive video frames; labeling the current video segment as a candidate video segment if the color map indicates the presence of a stable region of pixels falling within the predetermined color range for a predetermined number of successive video frames; for each candidate video segment, selecting one video frame out of every N video frames and creating a histogram of the stable region of each of the selected video frames; performing a first histogram comparison between the histograms corresponding to pairs of successively selected video frames; when a first histogram difference resulting from the first histogram comparison is greater than a first threshold value, performing a second histogram comparison on the stable regions of pairs of consecutive video frames located between the pair of successively selected video frames which resulted in the first histogram difference being greater than the first threshold value; and indicating a shot change in the candidate video segment when the second histogram comparison yields a second histogram difference greater than a second threshold value.

It is an advantage of the claimed invention that the method uses a simple algorithm for determining if pixels matching a skin color range are present in the video frames, and then determines if the matching pixels have a stable location corresponding to the position of a news anchor person. Furthermore, the histogram comparison process enables the claimed invention to quickly determine when the news anchor person is no longer being displayed in the stable region, indicating a change of the news segment. Moreover, by focusing on the stable region where the news anchor person is located, the claimed invention works well with split screen video frames by concentrating only on the region where the news anchor person's head is located. Thus, the claimed invention provides a robust and computationally light way to aid in the segmentation of news broadcasts.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
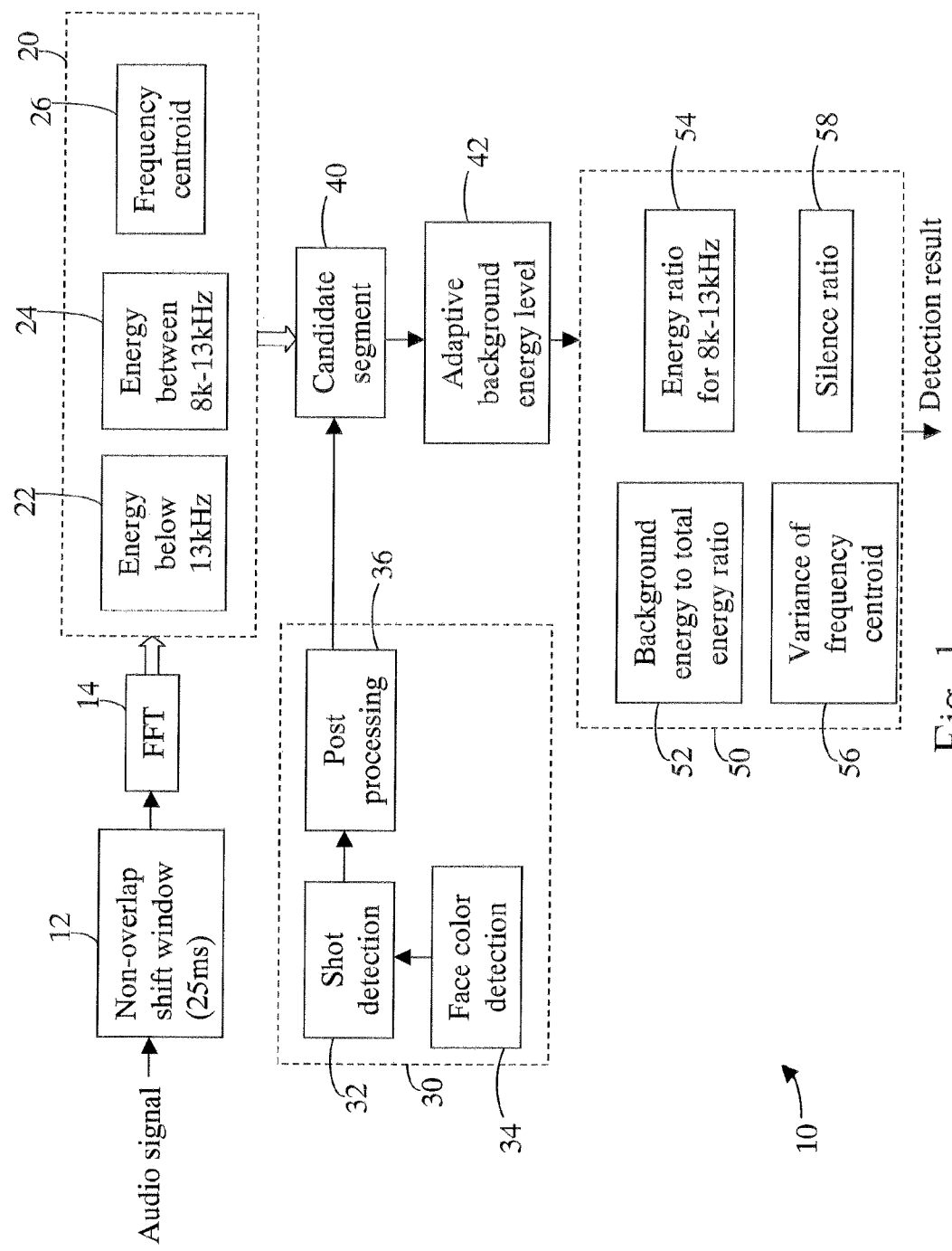
FIG. 1 is a block diagram of a system for performing television news segmentation based on news anchor person detection.

Please refer to FIG. 1. FIG. 1 is a block diagram of a system 10 for performing television news segmentation based on news anchor person detection. The system 10 contains video processing circuitry 30 for producing candidate segments 40 of news video according to the detection of the news anchor person. Once the candidate segments 40 have been generated, audio information of the video segments is analyzed for further verifying the accuracy of the video analysis.

Figure 2:
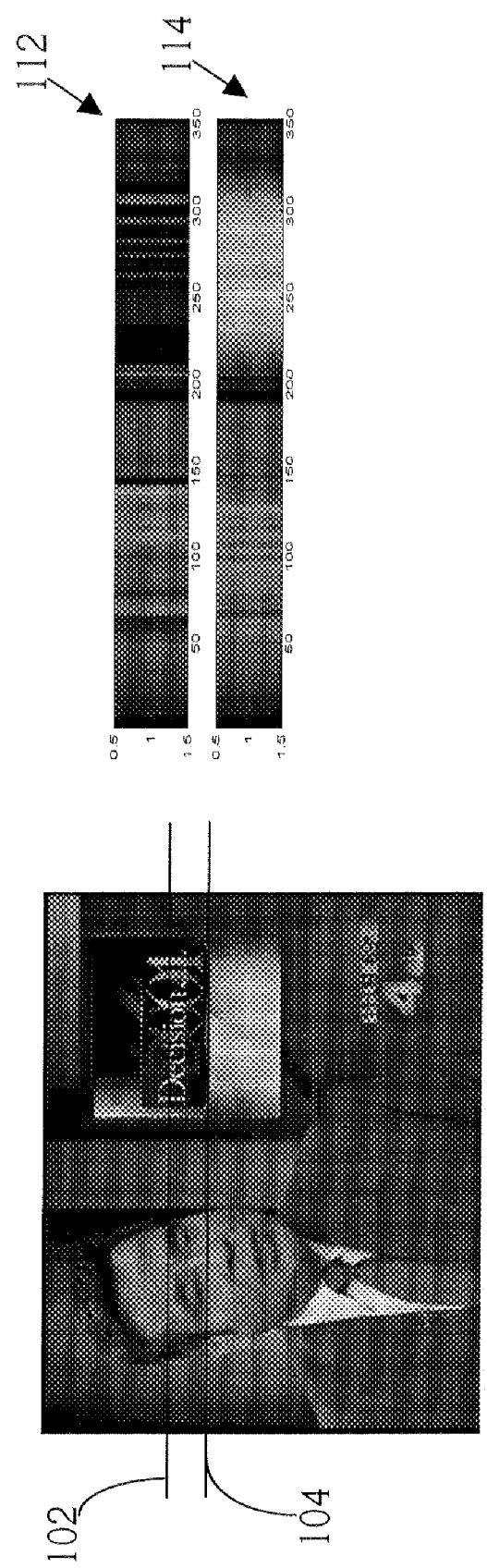
FIG. 2 shows the use of first and second horizontal scan lines for detecting the presence of a news anchor person's face on a video frame.
Figure 3:
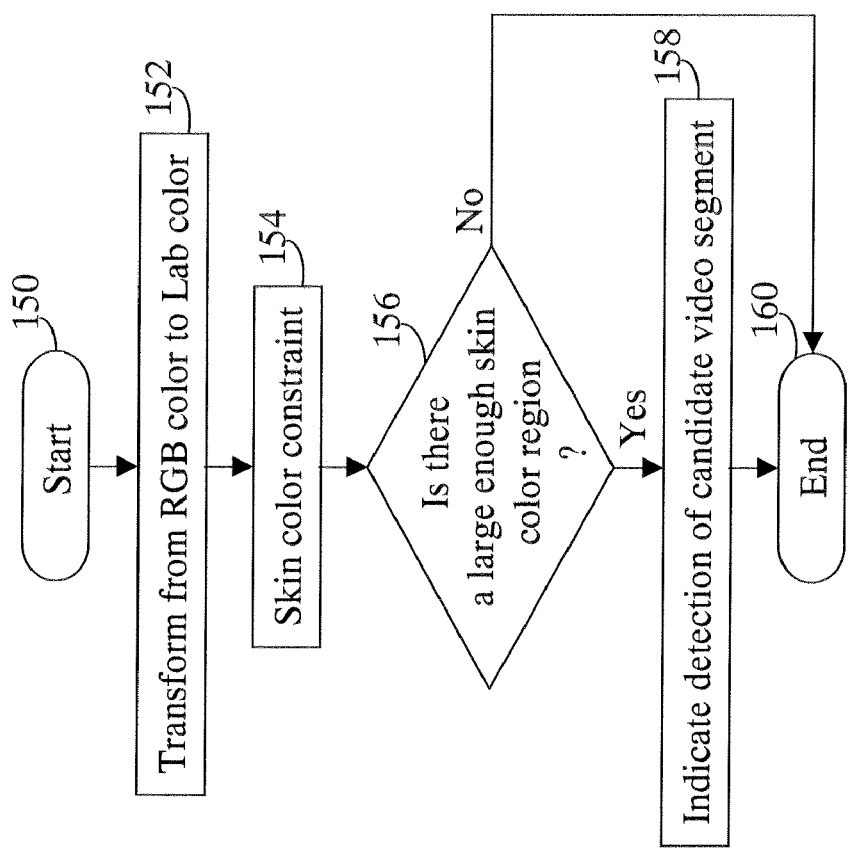
FIG. 3 is a flowchart illustrating the process of detecting the face of a news anchor person according to the present invention.

The video processing circuitry 30 contains a shot detection circuit 32, a face color detection circuit 34, and a post processing circuit 36. The face color detection circuit 34 is used to detect pixels on a video frame that fall within a predetermined range that is representative of skin color. Please refer to FIG. 2 and FIG. 3. FIG. 2 shows the use of first and second horizontal scan lines 102 and 104 for detecting the presence of a news anchor person's face on a video frame 100. FIG. 3 is a flowchart illustrating the process of detecting the face of a news anchor person according to the present invention.

Since research shows that photographers often try to place their subject's face at a position about one-third the way down from the top of the picture or video frame, the face color detection circuit 34 utilizes the first horizontal scan line 102 and optionally the second horizontal scan line 104 to detect pixels having the color of human skin. Although only the first horizontal scan line 102 is required for performing this function, use of the second horizontal scan line 104 enables the face color detection circuit 34 to give even more accurate results. For example, one horizontal scan line might pass through the eyes or the mouth of the news anchor person, which would skew the results since the horizontal scan line would detect colors other than skin colors even though the horizontal scan line passed over the face. To minimize these problems, and to provide more data that can be used to detect the position of the news anchor person's face, two horizontal scan lines can be used.

Each of the first horizontal scan line 102 and the second horizontal scan line 104 analyze at least one row of pixels of the video frame 100, and the resulting pixel colors are shown as samples 112 and samples 114, respectively. Please note that both the first horizontal scan line 102 and the second horizontal scan line 104 are preferably positioned near the "one-third mark" for increasing the probability of scanning the news anchor person's face. Steps contained in the flowchart of FIG. 3 will be explained below.

Step 150: Start.

Step 152: Transform the color space of the video frame 100 from a red, blue, green (RGB) color space to a Lab color space. The Lab color space is more suited towards detecting skin colors, and is preferably used. However, the present invention can also be used with a variety of other color spaces such as RGB, YCbCr, and IRgBy.

Step 154: Determine if the first horizontal scan line 102 (and optionally the second horizontal scan line 104) have scanned any pixels on the video frame that fall within a range of colors associated with skin color. This range of colors can be adjusted depending on the local region or according to studio lighting conditions.

Step 156: Determine if there is a large enough continuous skin color region. That is, determine if there is a group of consecutive pixels larger than a preset minimum that all fall within the range of colors associated with skin color. If there is a large enough continuous skin color region, go to step 158. If not, go to step 160.

Step 158: Indicate that the current video segment is considered a candidate video segment up to this point. As more video and audio analysis is performed on the video segment later, this video segment may then no longer be considered a candidate video segment.

Step 160: End.

Figure 4:
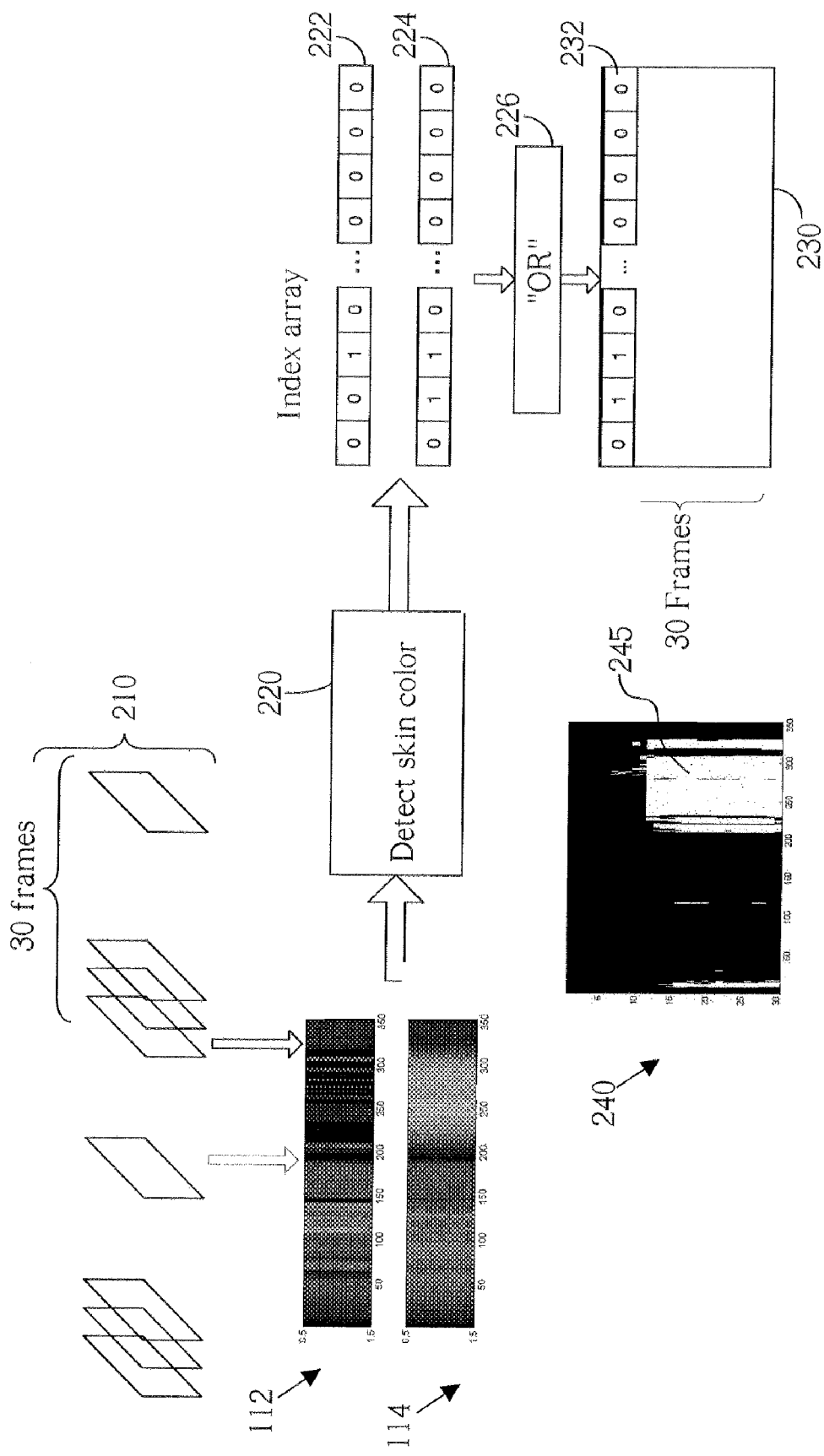
FIG. 4 is a diagram showing how to form a logic color map from two scan lines for detecting a news anchor person.

Please refer to FIG. 4. FIG. 4 is a diagram showing how to form a logic color map from two scan lines for detecting a news anchor person. During news broadcasts, the news anchor person's position is usually quite stable, so this fact can be used to check to see if consecutive video frames have skin colored pixels in approximately the same position. The examples shown in this disclosure assume that the video segments contain 30 video frames per second. This frame rate is not meant as limiting, and will be used more the sake of convenience in explaining the present invention method.

The first horizontal scan line 102 and the second horizontal scan line 104 are used to generate samples 112, 114 for a plurality of consecutive video frames 210, such as 30 consecutive video frames. Once the samples 112, 114 are generated, a skin color detection process 220 is run to categorize each of the pixels as being in a color range representative of skin color, represented with a logical "1", or as not being in a skin color range, represented with a logical "0". The results for samples 112, 114 are shown as index arrays 222, 224. A logical "OR" operation 226 is then performed on the two index arrays 222, 224 to produce resulting array 232. For each of the 30 consecutive video frames analyzed, the resulting arrays are then stored in a color map 230. An example graphical representation of the color map 230 is shown in color block 240. The 30 rows of the color block 240 correspond to each of the 30 video frames that were analyzed. The white blocks represent skin colored pixels whereas the black pixels do not. The stable presence of skin colored pixels in region 245 of the color block 240 located approximately from pixels 210 to 330, left to right, indicates that a news anchor person might be the subject of the video frames. For best results, more additional analysis can be performed for verification.

Figure 5:
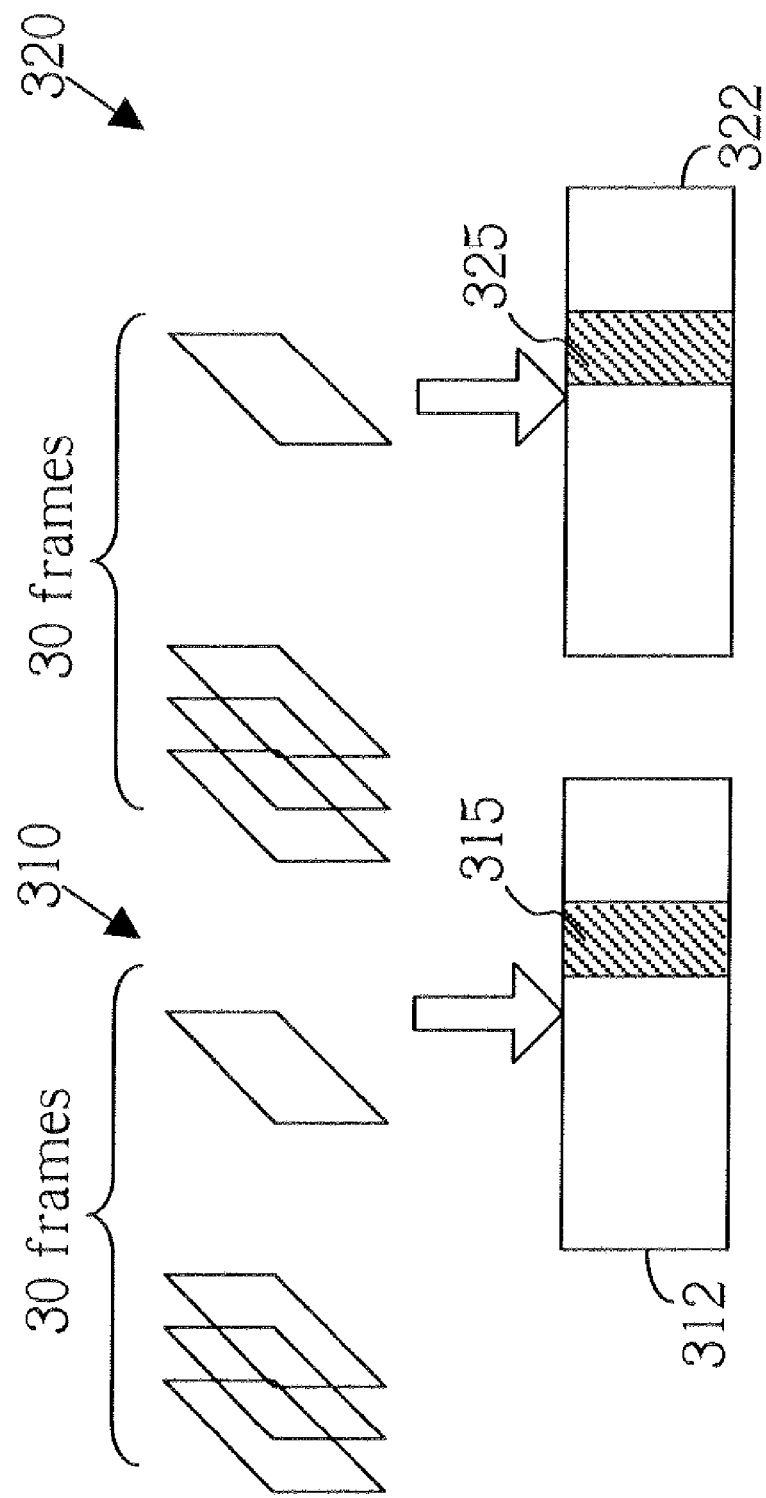
FIG. 5 is a diagram illustrating comparing the local histogram of strips of two video frames for detecting a shot transition.

Once the candidate video segments have been identified, the shot detection circuit 32 then helps to identify when the segment changes. For example, the shot detection circuit 32 can detect when a stable shot of the news anchor person changes to another shot by analyzing the color properties of the video frames. Please refer to FIG. 5. FIG. 5 is a diagram illustrating comparing the local histogram of strips 315, 325 of two video frames 312, 322 for detecting a shot transition. To reduce computational complexity, the shot detection circuit 32 first detects shot transitions on a large scale, and once a transition is found, then focuses on a narrower range to detect exactly where the transition took place.

FIG. 5 shows two sets of video frames 310, 320. In this example, each of the sets of video frames 310, 320 contains 30 video frames, which is equivalent to one second of video. A video frame is selected from each of the sets of video frames 310, 320. For simplicity, preferably every 30th video frame is selected for comparison. Video strips 315, 325 are selected from the consecutively chosen video frames 312, 322, where the strips 315, 325 correspond to the position of the region 245 of the color block 240 that indicates a stable presence of skin colored pixels. Thus, the position of the strips 315, 325 corresponds to the position of the news anchor person's head. Histograms for the strips 315, 325 of each of these consecutively chosen video frames 312, 322 are then compared with each other to perform a first histogram comparison. If the first histogram comparison reveals a histogram difference that is larger than a first threshold value, then a second histogram comparison is performed on corresponding strips of each pair of color frames located in the 30 intervening color frames to determine the exact video frame in which the shot transition is made. By focusing on the region represented by the strips 315, 325, the present invention works well with video frames containing split screens since only one portion of the video frame will be analyzed by the histogram comparison.

After the face color detection circuit 34 and the shot detection circuit 32 have produced candidate video segments, the post processing circuit 36 optionally performs extra steps. For instance, segments shorter than a predetermined length of time, such as one second or three seconds, can be removed because they are not likely to be shots of the news anchor person. In addition, the percentage of video frames containing a stable skin region can also be calculated for statistical purposes.

After the video processing circuitry 30 has generated the candidate segments 40, audio analysis can then be performed to provide additional information for more accurately detecting news segments. Some video footage contains many faces, such as a picture of a crowd. If this video data is used by itself, it could generate a false positive result of detecting a news anchor person. As another example, live reports or interviews also contain shots of large, stable faces. Without using audio analysis, these shots may also be determined to be shots of news anchor persons.

Audio data can also be used as primary information for determining candidate segments instead of merely being used to supplement the video data. If reliable audio processing techniques such as speaker identification are used, then the audio data can be used with a high degree of reliability.

Please refer back to FIG. 1. Audio signals are most useful when statistical values of the waveforms are generated. For this reason, a non-overlap shift window circuit 12 separates an audio signal into distinct 25 ms audio frames. Of course, this time period can be longer or shorter, and is used as an example only. A fast Fourier transform (FFT) is then performed on the audio windows using a FFT circuit 14, and the results are passed to an audio energy analysis circuit 20 for analyzing the energy of the audio samples. The FFT circuit 14 transforms the audio samples into the frequency domain for analyzing the frequency response of the audio samples. The audio energy analysis circuit 20 contains circuit 22 for calculating the energy of audio samples having a frequency less than 13 kHz, contains circuit 24 for calculating the energy of audio samples having a frequency of 8-13 kHz, and contains circuit 26 for calculating a frequency centroid of the audio samples. The frequency centroid is equal to the average amplitude of all of the frequencies for indicating the center of the frequency response. The output from each of these circuits 22, 24, 26 in the audio energy analysis circuit 20 is then combined with the output from the video processing circuitry 30 for allowing the video analysis to be considered together with the audio analysis.

An adaptive background energy level circuit 42 is used to calculate the average energy level of the background noise. To do this, the background energy level circuit 42 takes the average of the ten lowest values of local energy. The number of values used to calculate the average can be numbers higher or lower than ten, but calculating the average in this way will give a good indication of the background noise level of the audio data.

All of the energy level information calculated by the audio energy analysis circuit 20 and the background energy level circuit 42 is then passed to a ratio calculating circuit 50 for calculating a variety of energy ratios used for characterizing the type of audio data received. Circuit 52 is used to calculate a ratio of the background sound energy level to a total sound energy level. Circuit 54 is used to calculate a ratio of an average sound energy of audio frames having a frequency between 8 kHz and 13 kHz to the total sound energy level. Circuit 56 is used to calculate the variance of the frequency centroids for the current candidate segment. Circuit 58 is used to calculate a silence ratio, which is a ratio of the number of audio frames with a sound energy level below the background sound energy level to the total number of audio frames. After calculating the ratios outputted by circuits 52, 54, 56, and 58, the ratio calculating circuit 50 then compares the calculated ratios to a plurality of predefined ranges. If the audio features do not fall within one or more of these ranges, the corresponding video segments are eliminated as not being suitable candidate news segments. The rest of the remaining segments are output from the ratio calculating circuit 50 as detected news anchor person shots.

In summary, the present invention uses a combination of video and audio analysis to determine if a news segment contains a news anchor person or not. First, video analysis is performed to determine if pixels matching a skin color range are present in the video frames, and then to determine if the matching pixels have a stable location corresponding to the position of a news anchor person. After this, the histogram comparison process enables the claimed invention to quickly determine when the news anchor person is no longer being displayed in the news segment. Audio analysis is then performed to further narrow down the list of candidate segments.

The present invention method offers many advantages over other method of segmenting newscasts. For example, detection of news anchor persons works well even when the video frame contains two or more split frames or split screens. Either one horizontal scan line or two horizontal scan lines can be used, with the choice involving a tradeoff between a slight increase in computational complexity and potentially more accurate results, or less computational complexity and potentially less accurate results. Moreover, the present invention method works well with footage of one or more news anchor persons and also works well with multiple camera angles. Although not required, the use of the Lab color domain for performing pixel color measurements and comparisons helps to ensure that the present invention does a good job at detecting skin colors. Threshold values can also be adjusted according to different skin colors or different applications of makeup and cosmetics. Overall, the present invention method provides a computationally light way to provide television news segmentation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video segmentation method for segmenting video clips according to content of the video clips, the method comprising:

receiving a video signal containing a plurality of video frames;

applying a first horizontal scan line to video frames of the video signal, the first horizontal scan line selecting at least one row of pixels for analysis;

analyzing the pixels of the video frame located on the first horizontal scan line to determine if colors of the pixels fall within a predetermined color range;

indicating regions of adjacent pixels in the video frame that fall within the predetermined color range;

creating a color map utilizing pixels located on the first horizontal scan line from a plurality of successive video frames;

labeling the current video segment as a candidate video segment if the color map indicates the presence of a stable region of pixels falling within the predetermined color range for a predetermined number of successive video frames;

for each candidate video segment, selecting one video frame out of every N video frames and creating a histogram of the stable region of each of the selected video frames;

performing a first histogram comparison between the histograms corresponding to pairs of successively selected video frames;

when a first histogram difference resulting from the first histogram comparison is greater than a first threshold value, performing a second histogram comparison on the stable regions of pairs of consecutive video frames located between the pair of successively selected video frames which resulted in the first histogram difference being greater than the first threshold value; and indicating a shot change in the candidate video segment when the second histogram comparison yields a second histogram difference greater than a second threshold value.

2. The method of claim 1, wherein selecting one video frame out of every N video frames comprises selecting every Nth video frame.

3. The method of claim 1, wherein the first horizontal scan line is positioned at a location on the video frames approximately one-third of the distance down from the top of the video frames.

4. The method of claim 1, further comprising performing a RGB to Lab color transformation before analyzing the pixels of the video frame located on the first horizontal scan line to determine if colors of the pixels fall within the predetermined color range.

5. The method of claim 1, wherein the predetermined number of successive video frames is equivalent to three seconds of video.

6. The method of claim 1, further comprising:

applying a second horizontal scan line to the video frames of the video signal, wherein the first and second horizontal scan lines select the same number of rows for analysis;

assigning pixels of the video frame located on each of the first and second horizontal scan lines a logical value of "1" if the colors of the pixels fall within the predetermined color range;

performing a logical OR operation using corresponding pixels located on the first and second horizontal scan lines to create combined pixel data; and utilizing the combined pixel data to indicate regions of adjacent pixels in the video frame that fall within the predetermined color range and to create the color map from the plurality of successive video frames.

7. The method of claim 6, wherein the first and second horizontal scan lines are positioned near a location on the video frames one-third of the distance down from the top of the video frames.

8. The method of claim 1, further comprising removing candidate video segment whose length is less than a predetermined period of time.

9. The method of claim 1, further comprising:

receiving an audio signal associated with the received video signal; and analyzing the audio signal for filtering out candidate video segments, wherein the audio signal is processed in audio frames of a predetermined size.

10. The method of claim 9, further comprising transforming audio samples into the frequency domain for analyzing the frequency response of the audio frames and calculating a total sound energy level of the audio frames.

11. The method of claim 10, further comprising:
calculating a background sound energy level of the audio frames;
comparing the background sound energy level to the total sound energy level; and
eliminating the candidate video segment if a ratio of the background sound energy level to the total sound energy level is not within a first specified range.

12. The method of claim 10, further comprising:
calculating the average sound energy of audio frames having a frequency of 8-13 kHz;
calculating the ratio of the average sound energy of audio frames having a frequency of 8-13 kHz to the total sound energy level; and
eliminating the candidate video segment if the ratio of the average sound energy of audio frames having a frequency of 8-13 kHz to the total sound energy level is not within a specified range.

13. The method of claim 10, further comprising:
calculating the variance of frequency centroids for the current candidate segment; and
eliminating the candidate video segment if the variance of frequency centroids is not within a specified range.

14. The method of claim 11, further comprising:
calculating a ratio of the number of audio frames with a sound energy level below the background sound energy level to the total number of audio frames; and
eliminating the candidate video segment if the ratio of the number of audio frames with the sound energy level below the background sound energy level to the total number of audio frames is not within a second specified range.

15. A video segmentation method for segmenting video clips according to content of the video clips, the method comprising:
receiving a video signal containing a plurality of video frames;
receiving an audio signal associated with the received video signal;
applying first and second horizontal scan lines to video frames of the video signal, the first and second horizontal scan lines each selecting at least one row of pixels for analysis;
assigning pixels of the video frame located on each of the first and second horizontal scan lines a logical value of "1" if the colors of the pixels fall within a predetermined color range;
performing a logical OR operation using corresponding pixels located on the first and second horizontal scan lines to create combined pixel data;
utilizing the combined pixel data to indicate regions of adjacent pixels in the video frame that fall within the predetermined color range;
creating a color map utilizing the combined pixel data from a plurality of successive video frames;
labeling the current video segment as a candidate video segment if the color map indicates the presence of a stable region of pixels falling within the predetermined color range for a predetermined number of successive video frames;
for each candidate video segment, selecting one video frame out of every N video frames and creating a histogram of the stable region of each of the selected video frames;
performing a first histogram comparison between the histograms corresponding to pairs of successively selected video frames;
when a first histogram difference resulting from the first histogram comparison is greater than a first threshold value, performing a second histogram comparison on the stable regions of pairs of consecutive video frames located between the pair of successively selected video frames which resulted in the first histogram difference being greater than the first threshold value;
indicating a shot change in the candidate video segment when the second histogram comparison yields a second histogram difference greater than a second threshold value; and
analyzing the audio signal for filtering out candidate video segments, wherein the audio signal is processed in audio frames of a predetermined size.

16. The method of claim 15, wherein the first and second horizontal scan lines are positioned near a location on the video frames one-third of the distance down from the top of the video frames.

17. A video segmentation method for segmenting television news video clips according to detection of a news anchor in the video clips, the method comprising:
receiving a video signal containing a plurality of video frames of a news broadcast;
applying a first horizontal scan line to video frames of the video signal, the first horizontal scan line selecting at least one row of pixels for analysis;
analyzing the pixels of the video frame located on the first horizontal scan line to determine if colors of the pixels fall within a predetermined color range for detecting skin color of the news anchor;
indicating regions of adjacent pixels in the video frame that fall within the predetermined color range;
creating a color map utilizing pixels located on the first horizontal scan line from a plurality of successive video frames;
labeling the current video segment as a candidate video segment if the color map indicates the presence of a stable region of pixels falling within the predetermined color range for a predetermined number of successive video frames;
for each candidate video segment, selecting one video frame out of every N video frames and creating a histogram of the stable region of each of the selected video frames;
performing a first histogram comparison between the histograms corresponding to pairs of successively selected video frames;
when a first histogram difference resulting from the first histogram comparison is greater than a first threshold value, performing a second histogram comparison on the stable regions of pairs of consecutive video frames located between the pair of successively selected video frames which resulted in the first histogram difference being greater than the first threshold value; and
indicating a shot change in the candidate video segment when the second histogram comparison yields a second histogram difference greater than a second threshold value.

* * * * *